Sept. 11, 1962 K. STEINBUCH ET AL 3,053,936

TELEPHONE LINE SUPERVISORY SYSTEM

Filed Sept. 25, 1957 7 Sheets-Sheet 1

INVENTORS

K. Steinbuch - R. Braun - G. Merz

BY

ATTORNEY

INVENTORS
K. Steinbuch - R. Braun - G. Merz
BY Albert Reiss
ATTORNEY

Sept. 11, 1962 K. STEINBUCH ET AL 3,053,936

TELEPHONE LINE SUPERVISORY SYSTEM

Filed Sept. 25, 1957 7 Sheets-Sheet 3

INVENTORS

K. Steinbuch - R. Braun - G. Merz

BY Albert Peiss

ATTORNEY

TELEPHONE LINE SUPERVISORY SYSTEM

Filed Sept. 25, 1957 7 Sheets-Sheet 4

INVENTORS
K. Steinbuch - R. Braun - G. Merz
BY Albert Reiss
ATTORNEY

TELEPHONE LINE SUPERVISORY SYSTEM

Filed Sept. 25, 1957 7 Sheets-Sheet 5

INVENTORS
K.Steinbuch - R.Braun - G. Merz
BY Albert Peiss
ATTORNEY

INVENTORS

K. Steinbuch - R. Braun - G. Merz

BY [signature]

ATTORNEY

INVENTORS
K. Steinbuch - R. Braun - G. Merz
BY
ATTORNEY

United States Patent Office 3,053,936

Patented Sept. 11, 1962

3,053,936
TELEPHONE LINE SUPERVISORY SYSTEM

Karl Steinbuch, Stuttgart-Fellbach, Reinhold Braun, Stuttgart, and Gerhard Merz, Rommelshausen, Germany, assignors to International Standard Electric Corporation, New York, N.Y., a corporation of Delaware Filed Sept. 25, 1957, Ser. No. 686,109
Claims priority, application Germany Oct. 5, 1956
5 Claims. (Cl. 179—18)

This invention relates to an arrangement for the supervision of line conditions for telecommunication systems and in particular to telephone systems. Its principal object is to provide a new and improved supervising arrangement which reduces the number of items of apparatus per line.

In prior art line supervising systems for detecting the calling or non-calling condition of a line, it is common practice to utilize the current flowing over the line during a calling condition to change the biasing voltage of an electronic gating circuit. This biasing is utilized to pass or block an endless series of short impulses, the passing or blocking providing an indication of the line condition. In the situation wherein a large number of lines are to be supervised, it is common to apply the impulses cyclically and consecutively in sequence to the individual gating circuits assigned to lines and to utilize common control equipment for detecting the conditions of any of the lines being served.

In these known systems, a separate gating circuit or switching element is provided for the detection of a calling or non-calling condition and a seperate gating circuit or switching element is utilized for evaluating the effect of the line condition on the first gating circuit. Thus, it is necessary to provide more than one gating circuit or switching element per line to provide the noted supervision of lines.

In the present invention, the detection of a calling condition on a line is accomplished by utilizing a single switching element per line. This switching element is influenced by the electrical condition of the line and such influence is evaluated to determine the line condition.

The above-mentioned and other features and objects of the invention and the manner of attaining them will become more apparent and the invention itself will be best understood by reference to the following description of an embodiment of the invention taken in conjunction with the accompanying drawings in which.

Figure 1:
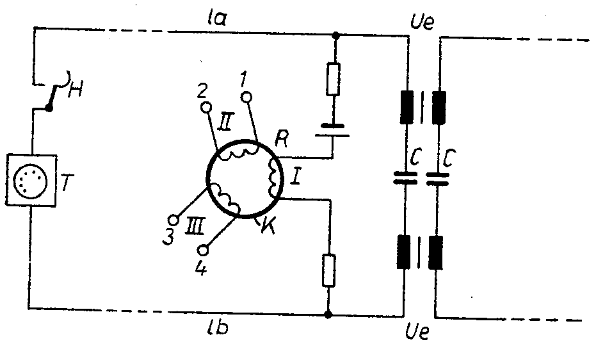
FIG. 1 is a schematic diagram showing the basic idea of the invention.

The idea of the invention will be explained briefly now with the aid of the FIG. 1. Each line *1a*—*1b* of a group of lines which are to be supervised (for example, subscriber's lines), is allotted an element R which consists of three coils I, II, III wound on one common core K consisting of ferromagnetic material. The coil I is connected between the line conductors *1a*—*1b* and is supplied by battery $B_1$. A fast sequence of short impulses are sent via terminals 1, 2 to coil II. If the subscriber's loop which includes subset T is interrupted, for instance by opening of the hook switch H, no current flows through the coil I and a current impulse sent to the coil II will produce an impulse in coil III. The impulse in coil III may be stored in a register (not shown) connected to terminals 3, 4. However, if the loop is closed, the common core K is premagnetized by the supply current of the line which flows through coil I in such a manner that saturation of the core is effected. When an impulse is now sent to coil II it produces only a negligibly low induction pulse in coil II which is not stored.

Figure 2:
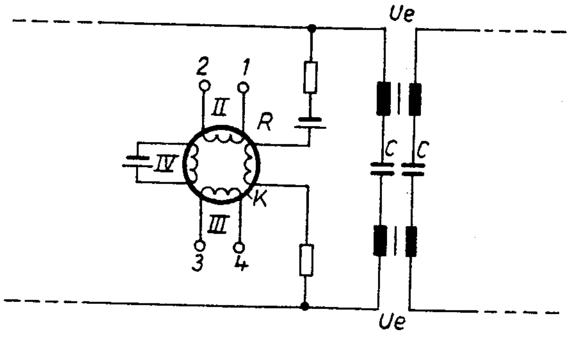
FIG. 2 is a schematic diagram of a testing arrangement according to the invention, with an additional coil for the working point displacement.

In an arrangement of this type, the danger prevails that the change of the line condition, i.e. a change of the magnetic flux caused through the opening or closing of the loop, will produce a faulty impulse in the reading coil III. To avoid this, another coil IV is provided on the core K, according to FIG. 2. A permanent current flows from a source $B_2$ through this coil IV in such a manner that the core K is magnetized in a direction opposite from the magnetization produced through the testing impulse applied to terminals 1, 2. A magnetic flux of such intensity is selected that the working point shown in the curve in FIG. 3 drops to point A. If an impulse is now sent to coil II while the loop is open, then the working point moves by the distance of point A to point X, and after the end of the impulse it returns again from point X to point A. The right flank of the hysteresis loop is at first ascended in its steep portion from point A' to point X' and subsequently the left flank is descended in its steep portion from point X' to point A'. The big changes of $\mathfrak{B}$, and thus of the flux $\Phi$ produced hereby, effect two corresponding impulses of different directions in the coil III; one of these impulses, for example the one produced by the trailing edge of the testing impulse, is recorded. However, if the loop of the line is closed the supply current of the line effects another displacement of the working point by distance *b* from point A to point Y. An impulse arriving now will only move the working point from Y to A, for example, under the condition that the value $b=a$ is selected, for instance through appropriate measurements of the coils. Due to the low induction change $\mathfrak{B}Y \rightarrow \mathfrak{B}A$, only a negligibly low induction impulse is effected thereby in coil III. Of course, distances *a* and *b* may also have differing values but it is advisable to select $b \geqq a$ for the purpose of avoiding too high a faulty impulse value. The arrangement of FIG. 2 has the advantage that more than double the flux change, as compared with the design according to FIG. 1, is available for the transmission of the impulse from coil II to coil III because the steep portion of the hysteresis curve is passed through completely.

To prevent the testing impulses which are sent to coil II, from producing disturbing noises on the line when the loop is closed it is possible theoretically, for example, to arrange the various displacements of the working point in such a manner that each of the testing processes takes place within the saturation range of the core, and for that reason they do not have any noticeable induction effects in coil I.

Figures 3, 4:
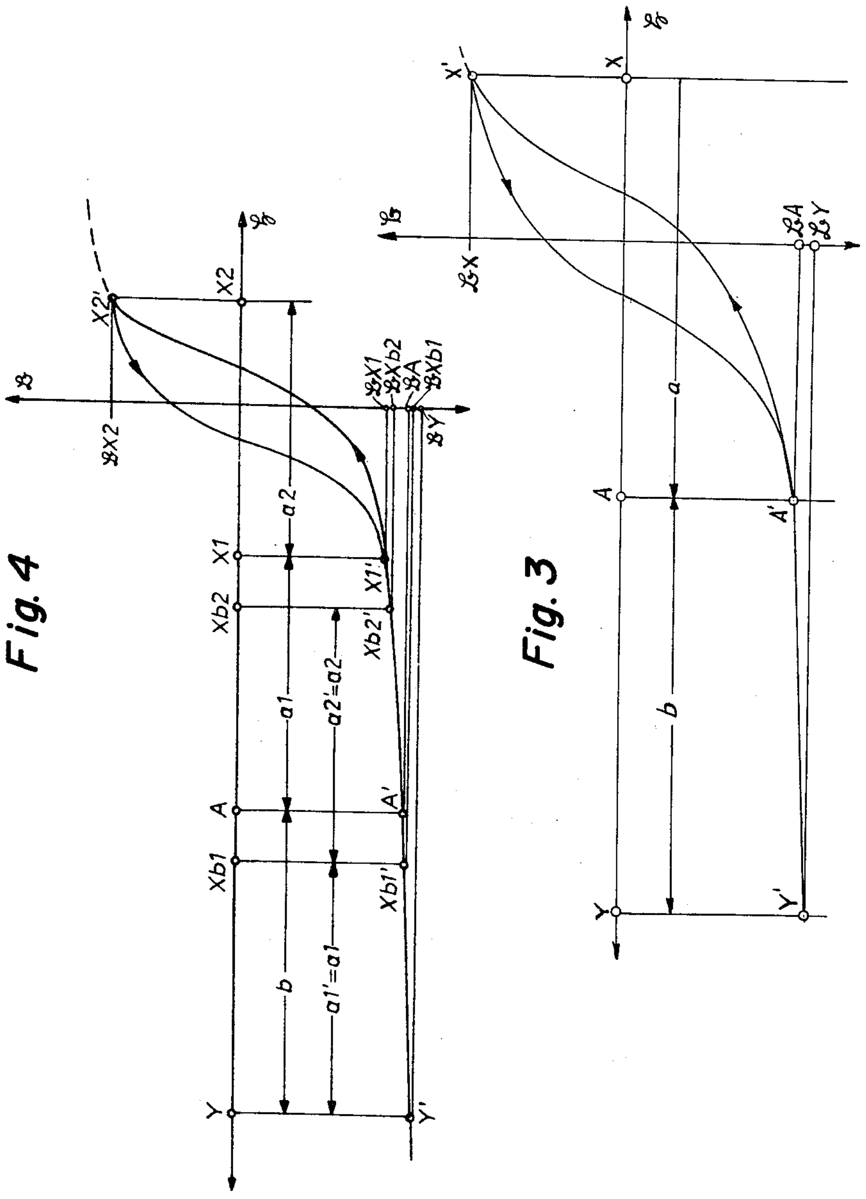
FIG. 3 is a graph of a hysteresis curve derived from the testing process according to FIG. 2.
FIG. 4 is a graph of a hysteresis curve derived from the testing process in a testing element, with a coordinate-type arrangement of a large number of testing elements.
Figure 5:
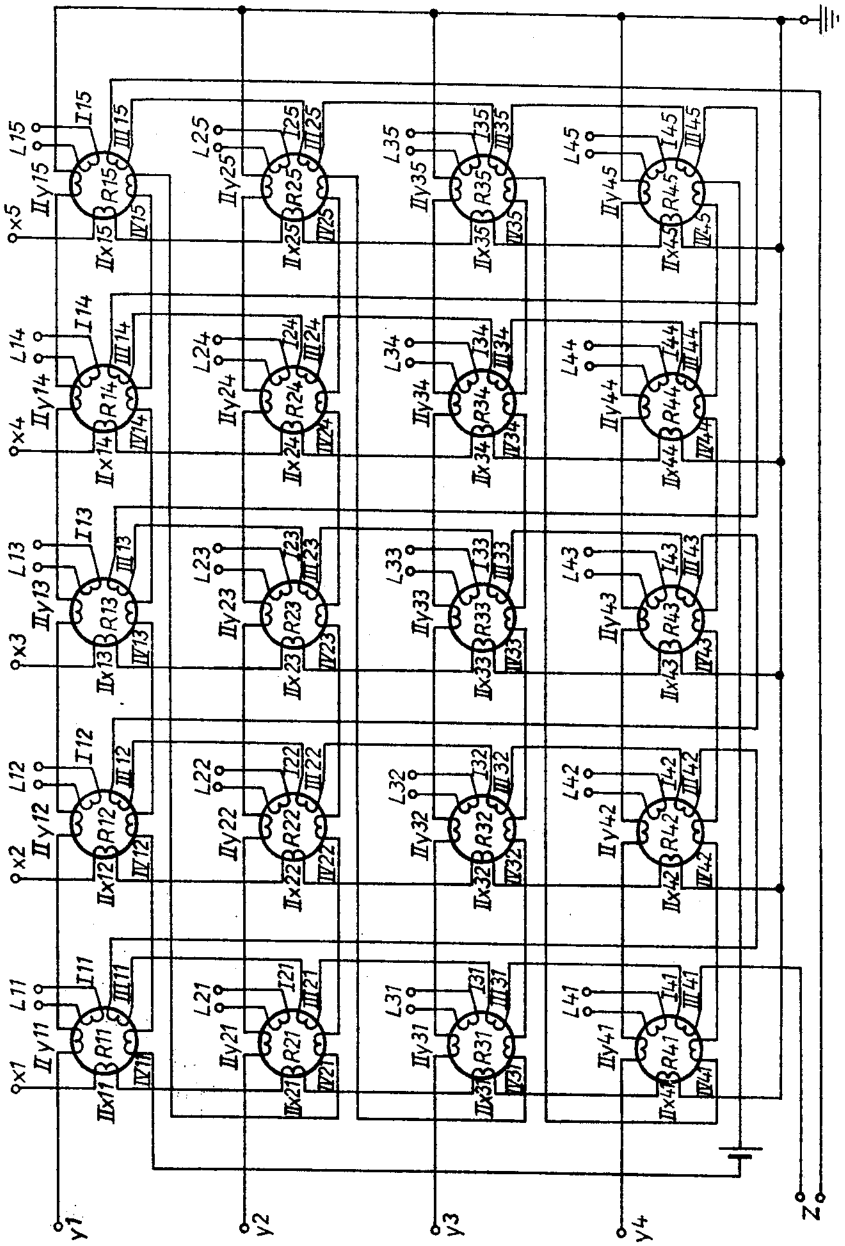
FIG. 5 is a schematic diagram of an example for the supervision of a group of lines by testing elements arranged in the form of coordinates.

It is possible to use a coordinate-type arrangement as schematically shown in FIG. 5 for the testing elements R which are allotted to the individual lines, for the purpose of being able to supervise a larger number of lines. In this case, the coil II of each testing element R is subdivided into two separate coils II$x$ and II$y$. The coils II$x$ of all lines belonging to a vertical column are connected in series, and the same applies to the coils II$y$ of all lines of each horizontal column are likewise connected in series. The testing is performed in such a way that the coils II$x$ of the vertical column and II$y$ of the horizontal column are given impulses of differing duration. The impulses of differing duration which are sent to the coils II$x$ and II$y$ overlap in such a manner that, for example, all horizontal columns are tested once during the duration of one impulse sent to a vertical column. The coils III, of all lines are connected in series, the cores IV of each column are connected in series and the coils I are only connected to the lines assigned to them. The circulation ratio, for example, of the various coils as well as the direction of the currents flowing through them, or rather of the impulses sent to them, are selected in such a manner for each individual testing element R that the method of operation, as explained with the aid of FIG. 4, is made possible.

Referring now to FIG. 4, the working point is moved to point A due to the flux in coil IV. If an impulse arrives now in coil II$x$ while the loop is interrupted, then this impulse will move the working point by distance $a1$ to point X1 for the time of its duration. The resulting induction change $\mathfrak{B}A \rightarrow \mathfrak{B}X1$ produces only a negligibly low induction pulse in the reading coil III. If an impulse arrives at the coil II$y$, during the duration of the impulse on the coil II$x$, then the working point moves further by distance $a2$ from point X1 to point X2, and after the end of this impulse it returns again to point X1. The hysteresis loop is passed through in the same manner as described above in connection with the description of FIG. 3, from point X1′ via point X2′ and back to point X1, and two induction pulses of opposite direction are produced in the reading coil III, one of which is evaluated in an appropriate manner. However, the flux in the coil I effects another displacement of the working point by the distance $a$ toward the left to point Y, if the loop is closed. If the loop is closed it is advisable to select a distance where $b \geqq a2$. In this manner the working point is moved by the longer-lasting impulse on coil II$x$ by distance $a1' = a1$ to point X$b1$, for example, and in the event of a coincidence through the short impulse on coil II$y$ up to point X$b2$. The induction pulses caused in the reading coil III by the individual impulse flanks are negligibly low due to the low induction change $\mathfrak{B}Y \rightarrow \mathfrak{B}Xb1$, $\mathfrak{B}Xb1 \rightarrow \mathfrak{B}Xb2$, or vice-versa.

Such an arrangement for 20 lines is shown schematically as an example in the FIG. 5. In this figure, the individual switching elements for the supervision are designated R and the coils, in accordance with the above given definitions, are designated I (line criterion), II$x$ (impulses for vertical columns), III (reading), IV (pre-magnetization for the working point displacement). Terminals $x$ and $y$ are the entries for the impulses which were sent consecutively to the columns and terminal Z is the output to the arrangement which evaluates the impulses induced in the reading coil III. The index numbers 1 . . . 5 are the ordinal numbers of the individual columns with the first numeral of the index number being the ordinal number of the horizontal columns and the second numeral being the ordinal number of the vertical column.

Figure 6:
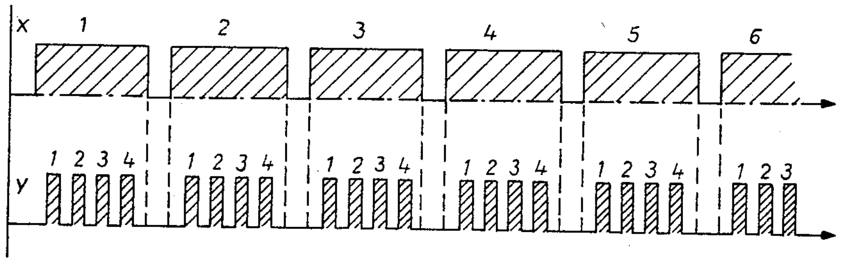
FIG. 6 is a graph showing a train of impulses usable for an arrangement according to FIG. 5.

The time sequence of the impulses can be seen in the graph of FIG. 6. To insure a clear testing, it is mandatory that, in each case, the impulses $x$ sent to the vertical columns overlap the first and last impulses of the impulse groups $y$ which are sent to the horizontal columns during the duration of the impulses $x$. The individual impulses of the various chains of impulses, designated through 1, 2, 3, 4 and 5 are, of course, in each case connected to the various testing elements of the respective columns in cyclic order through an appropriate distributor circuit. In view of the explanations given above with the aid of FIGS. 4–6, it appears unnecessary to present a further detailed description of the method of operation of the arrangement as shown in FIG. 5.

Figure 7:
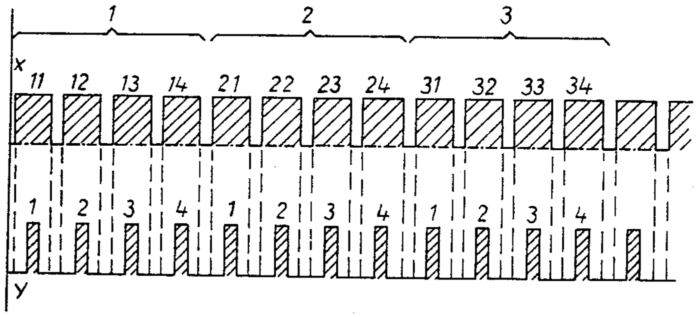
FIG. 7 is a graph showing a train of impulses of a different type, usable for an arrangement according to FIG. 5.

Instead of one long impulse which lasts through the entire time of the actual reading impulses, a sequence of an equal number of impulses may also be given for each of the two coordinate directions. However, it is to be seen to that the impulses provided for the one coordinate direction will, in each case, overlap their corresponding impulses of the other coordinate direction at the beginning as well as at the end of the impulse, as is shown in the graph of FIG. 7. The pulse designations are identical with those of FIG. 6.

It is self-evident that the arrangement as shown in FIG. 5 is able to operate also in another manner than that shown in FIG. 4. For example, if the flux through coil IV moves the working point completely toward the left, nearly up to the lower knee of the hysteresis curve, as a result of the current flowing through coil I when the loop is closed, the flux produced by the long impulse then moves the working point to the upper knee so that the hysteresis loop is now passed in the reverse direction when the short impulse arrives which has, in this case, the opposite direction, as shown in the previous example. All processes take place in the lower flat portion on the hysteresis curve if the loop is not closed To prevent switching-in or switching-off processes simulating a spurious coincidence on any other line but the one to be tested, by causing an undesired faulty impulse in the reading coil, it is possible to have the processes on the lines take place on the very flat flanks instead of the very steep flanks of the testing impulses. This holds the value $$\frac{d\phi}{dt}$$

and the amplitude of the faulty impulse negligibly low in comparison to the amplitude of the measuring and useful impulses evaluated in the arrangement for the evaluation, in a manner similar to the impulses caused by the working point displacements (for instance $\mathfrak{B}Y \rightarrow \mathfrak{B}A$ in FIG. 3) which are not evaluated. A similar principle applies to the slope of the flanks of the long impulses if they effect a working point displacement, as described last, via the steep portion of the hysteresis loop. In this case, too, a faulty impulse of too high an amplitude on the reading coil can be avoided at the beginning or the end of the testing impulse. This is possible since the flanks are considerably flatter than those of the short testing impulses. There is another possibility to avoid a faulty evaluation in the last-mentioned case, not by keeping the impulse in the reading coil low but by having the time program of the entire arrangement prevent such undesired evaluation.

Figure 8:
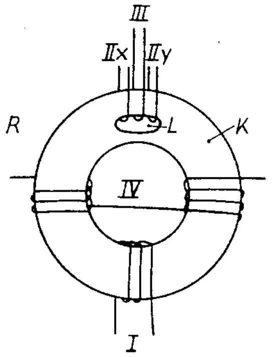
FIG. 8 shows a special design of the testing element for the purpose of uncoupling line loops on the one hand and impulse coils on the other hand.
Figure 9:
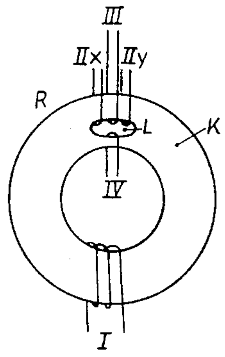
FIG. 9 shows a modification of FIG. 8.

To prevent a transmission of the impulses as disturbing noises to the loop, for example to the speech circuit of a subscriber's set as shown in FIG. 8, de-coupling of the coil I (line loop) and of the other coils can be effected by providing a gap L, which may consist, for example, of a round or oval hole, in the ring core (K) of the testing element R. The coil I, as well as the interacting coil IV (premagnetization for working point displacement), are then installed on the ring core in a conventional manner, but the testing and reading coils II (or respectively II$x$ and II$y$) and III are conducted through gap L. In general, just a few windings are sufficient for that purpose. This causes the flux produced by the coils II (II$x$ and II$y$) and III to form essentially around the gap L and not around the winding I. On the other hand, the flux effected by the coils I and IV contributes in the desired manner to the saturation of the core K including that portion thereof whose cross section is enclosed by the coils II (II$x$ and II$y$) and III. The coil IV which serves the purpose of displacing the working point can also be conducted through the gap L, in the manner as shown in FIG. 9. It is posible thereby to decrease the number of its windings.

Figure 10:
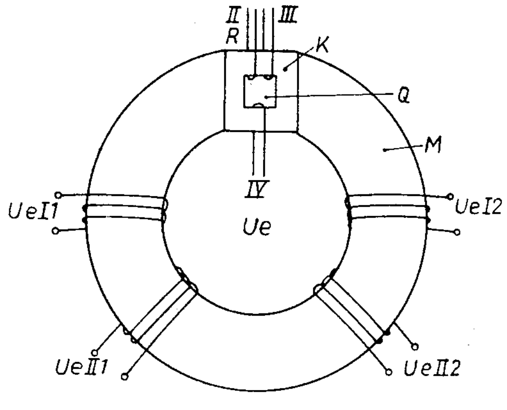
FIG. 10 shows the installation of a testing element in a ring transformer.

If the lines to be supervised are telephone lines, it is possible to simplify the arrangement by putting the testing element R, instead of an air gap, into the transformer of the respective line, as shown in the FIG. 10.

Figure 11:
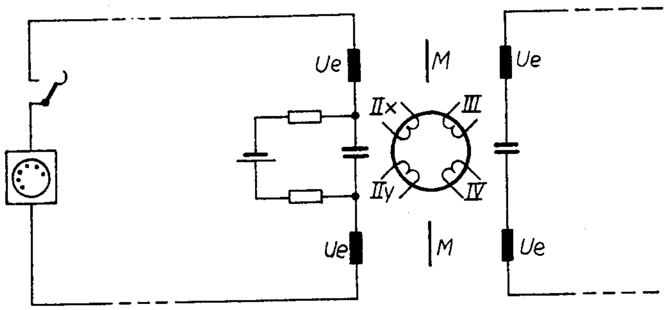
FIG. 11 is a schematic diagram of an embodiment of the invention utilizing a transformer according to FIG. 9.

The core KQ of the testing element R is then designed quadrangular and is provided with a gap Q through which the windings II (II$x$, II$y$), III, and IV are passed. The core is of a ferromagnetic material and its saturation condition is reached through an essentially lower magnetic flux than in the core M of the repeater shown in FIG. 11. If now, according to FIG. 11, the line which is to be supervised is supplied in such a manner that the supply current flows through the primary windings of the repeater U$e$, then these windings assume the function which coil I had in the previously described examples; thus coil I can be omitted in this case. At the same time, the core K is already in saturated condition and has the effect, in the entire arrangement, of an air gap while the magnetic condition of the core M still permits a satisfactory transmission of speech. Of course, the material as well as the relative measurements of both cores, and the ratio of windings of the coils, must be selected accordingly and adjusted to each other.

Figure 12:
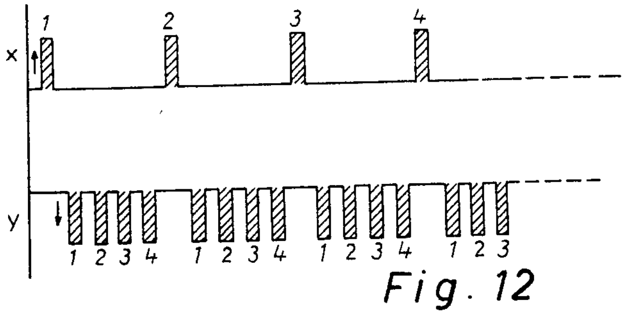
FIG. 12 is a graph showing the testing impulse train for an arrangement according to FIG. 5 when ferromagnetic material of high remanence (for instance ferrite) is used for the cores of the testing elements.

It is advisable to use, for the cores K of the testing elements R, a ferromagnetic material having a substantially rectangular hysteresis curve. It is possible in this case to utilize the simultaneously obtained storing qualities of the cores K. The coil IV need not be provided in this case because the extraction of stored information involves a scanning process and a displacement of the working point is not necessary even in the starting condition. Furthermore, it is sufficient now to provide, in the case of a coordinate-type arrangement, impulses having the same time duration for the vertical as well as for the horizontal columns. As shown in FIG. 12, the first impulse $x$ of each train of impulses causes all cores of the testing elements allotted to this column to enter the positive saturation range, for example, under the condition that their loop is not closed. In such case they are pre-magnetized in the reverse direction, i.e. in the example chosen in the negative direction, through the current flowing in coil I or respectively in the primary repeater windings. In this latter case, the working point is moved so far that a reverse magnetization is not possible. The other impulses ($y$) of the train of impulses pass through the coils II$y$ of the individual elements R in such a manner that those testing elements R which (according to the example chosen) are in the positive saturation range are again magnetized in the opposite sense. Therefore an induction pulse which is evaluated is produced in the reading windings III.

Figure 13:
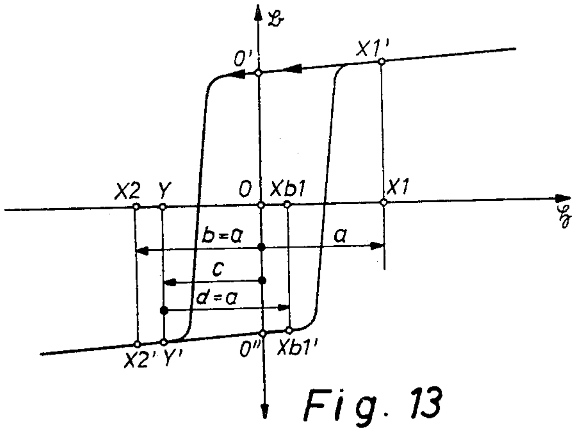
FIG. 13 is a graph showing an approximately rectangular hysteresis curve of the testing process in a testing element when ferromagnetic material is used.

It is easy to recognize the processes in a testing element with the aid of the graph shown in FIG. 13. When the loop is open, the working point is briefly moved by the first impulse from O to XI, and back to O again at the end of the impulse. As a result thereof, the hysteresis curve is passed from point O″ via point XI′ to point O′ and the core is now in the positive remanence condition. The second impulse which arrives now and which corresponds with the second coordinate value, effects a displacement of the working point from point O to point X2 and back to point O in the same mnaner. The hysteresis curve is passed through from point O′ via point X2′ to point O″ and the magnetization of the core is reversed; it is now again in the negative remanence condition and is ready for another testing. When the loop is closed, the loop current effects a displacement of the working point, from point O to point Y for example. During the first impulse, the hysteresis curve is passed through only from point Y′ to X$b$1, and no reverse magnetization is effected. For that reason the second impulse, operating in the opposite direction, is not able to produce an induction pulse in the coil III.

Figure 14:
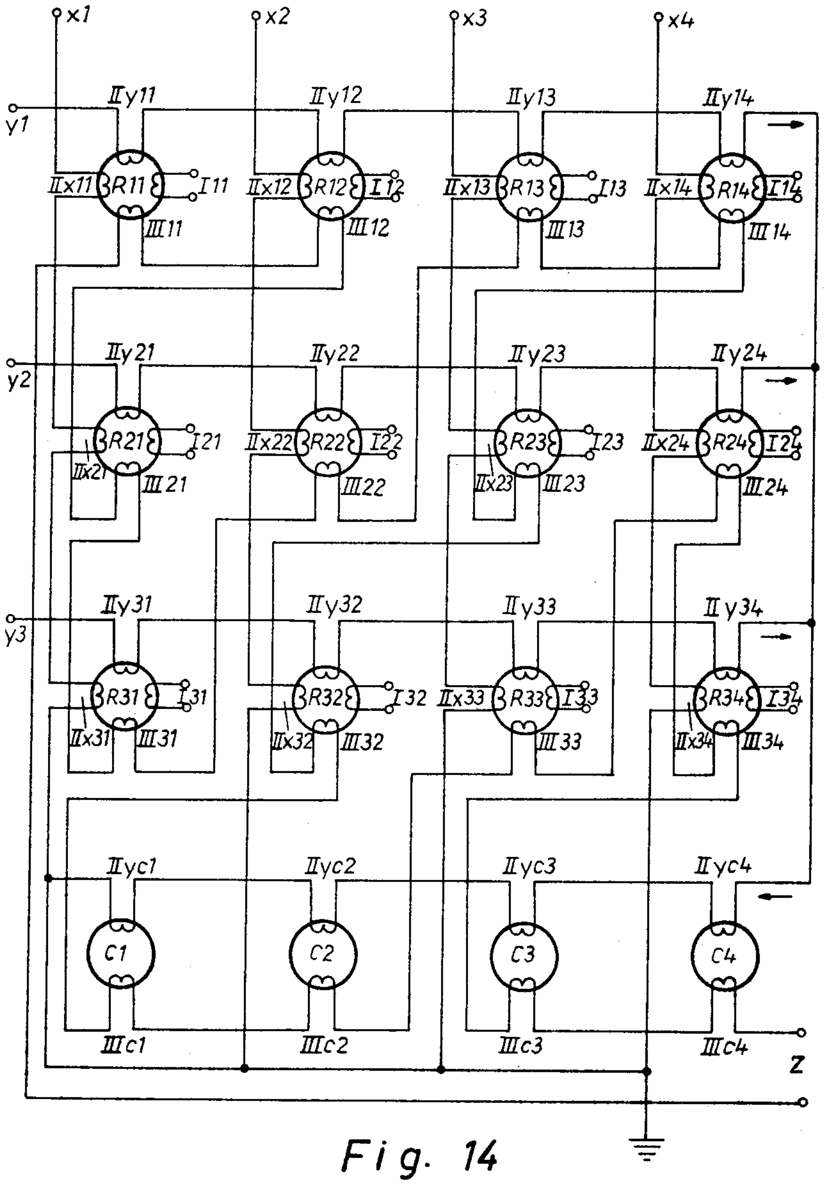
FIG. 14 is a schematic diagram of an example for a compensation circuit for the suppression of faulty impulses which appear in the reading coils.

The core of those testing elements which are not to be read just at this time are in the negative remanence condition, due to a premagnetization for a working point displacement in a magnetic condition corresponding with the working point. Nevertheless their testing coils receive the impulse passing through for the other coordinate direction, so that a low induction pulse is produced in each case in the reading coils due to the low induction variation, for example $\mathfrak{B}A \rightarrow \mathfrak{B}X1$ in FIG. 4, or due to the reversible permeability of the cores consisting of material with a rectangular hysteresis curve. These disturbing impulses would add up and their sum might result in a wrong signal. To avoid such disturbing impulses, appropriate compensation arrangements or compensation measures could be provided in a conventional manner for the testing elements arranged in the form of coordinates, for example as shown in the FIG. 14 for a group of 12 lines. In addition to the testing elements R, arranged in the design of coordinates, a horizontal column of compensation elements C is also provided. Their design is identical with that of the testing elements but they have only the coils II$y$ and III. One such element C is provided for each vertical column. The indices used in this column should be understandable without difficulties. The other designations correspond with those of FIG. 5. The coils III$c$1—III$c$4 are connected in series with the reading coils III of all the testing elements which are arranged in the form of coordinates. The coils II$yc$1—II$yc$4 are connected in series, but opposing, with the vertical columns of the testing coils II$y$ of the testing elements R, via the common point W. Thus they are passed through by each of the impulses conveyed consecutively to the horizontal columns, and in each case they compensate for the faulty impulse induced in the corresponding coil III of the horizontal column which is being tested by a counter-impulse in the individual coil III$c$1—III$c$4. However, if a useful impulse is produced in coil III of the tested column, then the minor counter amplitude of the corresponding compensation impulse is without importance. Any other arrangement of elements serving this purpose is also possible.

In systems where storing arrangements are provided for the storing of information, in which for example one line corresponds with each category of information and one certain time position corresponds with each individual line, the testing elements R can be inserted in a simple manner as one more information line to the storing arrangement.

Depending upon special circumstances and tasks, it might be of advantage to construct the cores K of the testing elements R, from a material with a short magnetic reversal time and with a low coercive force, or respectively with low saturation field intensity. For example a ferrite with the suitable characteristic or another metal with similar qualifications would be satisfactory. In conclusion it is to be pointed out that the core K of the testing arrangement R may, of course, be designed in any suitable form (ring-shaped, rectangular, window-shaped etc.).

The above described designs according to the invention, constitute only examples which, of course, do not exclude another design. The use of the arrangement according to the invention is, of course, not limited to telephone lines but instead such supervision of the line conditions can also be provided in all other types of signal lines or similar lines.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A supervisory arrangement for a telecommunication system comprising a plurality of subscriber lines each having stations thereon, means in each station responsive to the initiation of a call for closing a loop across the associated line, a plurality of magnetic elements arranged in horizontal and vertical rows, each said element comprising a magnetic core having a substantially rectangular hysteresis characteristic, each of said magnetic cores including a plurality of windings comprising a line winding, first and second test windings and an output winding, means connecting the line windings to respective ones of said lines, means for interconnecting the first test winding of each core in each vertical row and for interconnecting the second test winding of each core in each horizontal row, means cyclically and sequentially applying test potentials to the first and second interconnected test windings of the horizontally and vertically arranged cores to simultaneously energize the first and second test winding of each core on a one-at-a-time basis to generate an output potential on the associated output winding, and means operable responsive to the closure of the loop on the line associated with any core having both its test windings energized for energizing the connected line winding to cause the blocking of the generation of an output potential on the associated output winding, whereby the calling condition of each line may be cyclically and sequentially tested.

2. A supervisory arrangement as claimed in claim 1, wherein said windings further comprise a pre-magnetizing winding in cooperative relation with said core, said last mentioned winding adapted to be coupled to a source of premagnetizing potential whereby the magnetic characteristics of said core are displaced in a given direction along its characteristic curve, in an opposite direction to the characteristics imparted to said core by said test potential.

3. A supervisory arrangement as claimed in claim 2, wherein means is provided for connecting the pre-magnetizing windings of said horizontally and vertically arranged magnetic elements in series relationship.

4. A supervisory arrangement as claimed in claim 1, wherein each of said cores comprises a toroid having an aperture extending through the wall thereof.

5. A supervisory arrangement as claimed in claim 4, wherein said aperture extends axially through the wall of said toroid, said first and second test inputs and said output windings extending through said aperture.

References Cited in the file of this patent

UNITED STATES PATENTS

| | | |
|---|---|---|
| 2,378,541 | Dimond | June 19, 1945 |
| 2,734,182 | Rajchman | Feb. 7, 1956 |
| 2,736,880 | Forrester | Feb. 28, 1956 |
| 2,784,390 | Chien | Mar. 5, 1957 |
| 2,803,812 | Rajchman | Aug. 20, 1957 |
| 2,854,517 | Heetman | Sept. 30, 1958 |
| 2,898,591 | Post | Aug. 4, 1959 |